Patented Nov. 5, 1935

2,019,830

UNITED STATES PATENT OFFICE 2,019,830

SOLUBLE ORTHO-HYDROXYAZO DYE AND ITS PRODUCTION

Max Raeck, Dessau-in-Anhalt, Germany, assignor to General Aniline Works, Inc., New York, N. Y., a corporation of Delaware No Drawing. Application November 25, 1932, Serial No. 644,403. In Germany January 9, 1932

10 Claims. (Cl. 260—97)

The present invention relates to a process of manufacturing new azo dyes and more particularly to wool dyes with which it is possible to carry out the mordanting with chromium compounds and the dyeing process in a common bath thus producing dyeings fast to milling without the necessity either of a preliminary mordanting or after-treatment.

Further objects of my invention are the new dyes obtainable according to the said process.

In U. S. Patents Nos. 657,064 and 657,065 there are described azo dyes derived from picramic acid and metadiamines; these are known in the trade as Metachrome Browns (Schultz, Farbstofftabellen 1923, No. 89).

According to the present invention valuable Metachrome dyes are obtained by coupling diazotized 2-amino-4,6-dinitro-1-hydroxybenzene with a meta-diamine of the benzene series, in which one or both amino groups contain a hydroxyalkyl- or di-hydroxyalkyl group or groups, and which may contain further nuclear substituents. These new dyes correspond to the general formula

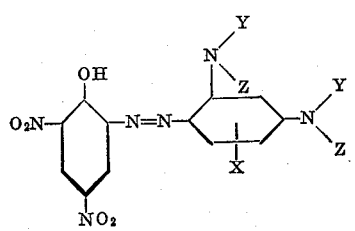

in which X may be hydrogen, halogen, an alkyl or alkoxy group and Y and Z stand for hydrogen, a hydroxyalkyl or polyhydroxyalkyl group, at least one Y or Z however being a radicle other than hydrogen.

These dyes are characterized, as compared with the known dyes of this kind, by a better solubility and by a shifting of the tint towards red.

The hydroxyalkylated or dihydroxyalkylated meta-diamines are obtainable by condensing ethylene oxide, propylene oxide or a similar alkylene oxide, ethylene chlorhydrin, mono-chlorhydrin, epichlorhydrin or the like with the diamine.

The following examples illustrate the invention, the parts being by weight:—

*Example 1.*—18.9 parts of 2-amino-4,6-dinitro-1-hydroxybenzene are diazotized by means of 18 parts of hydrochloric acid of 20° Bé. and 6.9 parts of sodium nitrite. The diazo compound is allowed to run into a hydrochloric acid solution of 15 parts of 1-amino-3-hydroxyethylaminobenzene, the coupling is completed by addition of sodium acetate and the dye is isolated in the usual manner. It is obtained in good yield. It is readily soluble and yields on wool with Metachrome mordants a deep brown of good fastness.

*Example 2.*—When for the 1-amino-3-hydroxyethylaminobenzene used in Example 1 there is substituted the corresponding quantity of 4-chloro-3-amino-1-hydroxyethylaminobenzene, there is obtained a dye which dyes wool red brown tints.

*Example 3.*—When for the 1-amino-3-hydroxyethylaminobenzene used in Example 1, there is substituted the corresponding quantity of 1-amino-3($\beta,\gamma$-dihydroxylpropyl)-aminobenzene, there is obtained a dye which dyes wool deep violet brown.

*Example 4.*—When 4-chloro-3-amino-1-($\beta,\gamma$-dihydroxypropyl)-aminobenzene is used as the diamine, there is produced a dye which dyes wool very similarly to the dye described in Example 1.

*Example 5.*—When an equivalent quantity of 1($\beta,\gamma$-dihydroxypropyl)-amino-3-($\beta,\gamma$-dihydroxypropyl)-aminobenzene is substituted for the 1-amino-3-($\beta,\gamma$-dihydroxypropyl)-aminobenzene of Example 3, there is obtained a dye which dyes wool in markedly redder tints than those obtained with the product of Example 3.

*Example 6.*—When an equivalent quantity of 1-methyl-2-amino-4-($\beta,\gamma$-dihydroxypropyl)-aminobenzene is coupled as indicated in Example 1 with diazotized 2-amino-4,6-dinitro-1-hydroxybenzene a dye is obtained which dyes wool in the presence of a chromium mordant deep violet-brown tints.

*Example 7.*—When electing as azo component 1-amino-3-di-(hydroxyethyl)-aminobenzene this compound yields when coupled with diazotized 2-amino-4,6-dinitro-1-hydroxybenzene a dye which dyes wool in the presence of a chromium mordant Bordeaux tints.

It is obvious that my invention is not limited to the foregoing examples or to the specific details given therein. Thus, I may use other hydroxyalkylated meta-diamines which are substituted in the nucleus by the substituents indicated in the general formula given above. On the other hand, other hydroxyalkyl or polyhydroxyalkyl radicals may be substituents in the amino group or amino groups of the meta-diamines in question. However, inasmuch as the hydroxyethyl and $\beta,\gamma$-dihydroxypropylamines are easily obtainable on a technical scale, I prefer to use these compounds as azo components. Finally, I state that the number of hydroxyalkyl radicals introduced into the amino groups of the metadiamine in no way limits my invention.

What I claim is:—

1. The azo dyes corresponding to the general formula

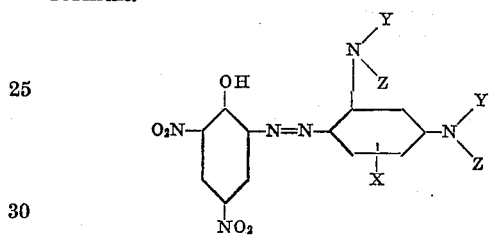

wherein X means hydrogen, halogen, an alkyl or alkoxy group and Y and Z stand for hydrogen, a hydroxyalkyl or polyhydroxyalkyl group, at least one Z however being a hydroxyalkyl- or polyhydroxyalkyl group, these dyes being in the dry pulverized shape dark powders which are easily soluble in water and which dye wool in the presence of a chromium mordant reddish brown to Bordeaux tints.

2. The azo dyes corresponding to the general formula

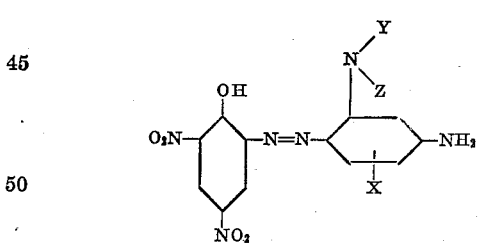

wherein X means hydrogen, halogen, an alkyl or alkoxy group and Y and Z stand for hydrogen, a hydroxyalkyl or polyhydroxyalkyl group, at least one of these substituents however being a hydroxyalkyl- or polyhydroxyalkyl group, these dyes being in the dry pulverized shape dark powders which are easily soluble in water and which dye wool in the presence of a chromium mordant reddish brown to Bordeaux tints.

3. The azo dyes corresponding to the general formula

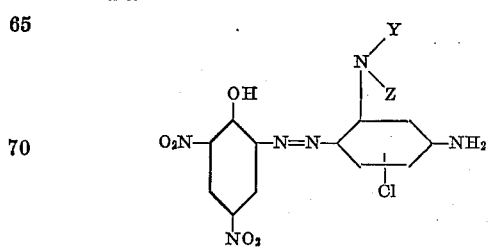

wherein Y and Z stand for hydrogen, a hydroxyalkyl or polyhydroxyalkyl group, at least one of these substituents however being a hydroxyalkyl- or polyhydroxyalkyl group, these dyes being in the dry pulverized shape dark powders which are easily soluble in water and which dye wool in the presence of a chromium mordant reddish brown to Bordeaux tints.

4. The azo dyes corresponding to the general formula

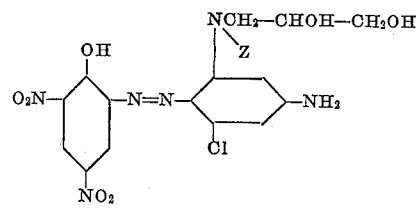

wherein Z stands for hydrogen or the $\beta,\gamma$-dihydroxypropyl group, these dyes being in the dry, pulverized shape dark powders which are easily soluble in water and which dye wool in the presence of a chromium mordant deep violet-brown tints.

5. The azo dye corresponding to the formula

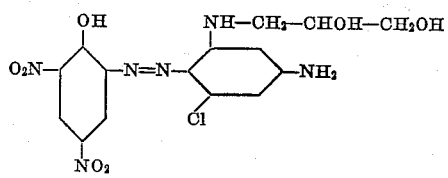

this dye being in the dry pulverized shape a dark powder which is easily soluble in water and which dyes wool in the presence of a chromium mordant deep violet-brown tints.

6. The process which comprises diazotizing 1-hydroxy-2-amino-4,6-dinitrobenzene and coupling it with a substituted meta-diamine of the general formula

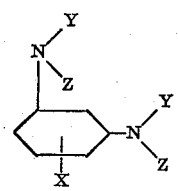

wherein X means hydrogen, halogen, an alkyl or alkoxy group and Y and Z stand for hydrogen, a hydroxyalkyl or polyhydroxyalkyl group, at least one Z however being a hydroxyalkyl- or polyhydroxyalkyl group.

7. The process which comprises diazotizing 1-hydroxy-2-amino-4,6-dinitrobenzene and coupling it with a substituted meta-diamine of the general formula

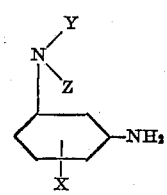

wherein X means hydrogen, halogen, an alkyl or alkoxy group and Y and Z stand for hydrogen, a hydroxyalkyl or polyhydroxyalkyl group, at least one of these substituents however being a hydroxyalkyl- or polyhydroxyalkyl group.

8. The process which comprises diazotizing 1-hydroxy-2-amino-4,6-dinitrobenzene and coupling it with a substituted meta-diamine of the general formula

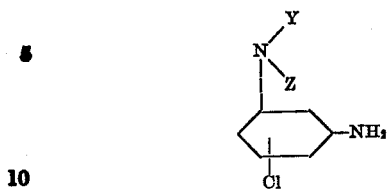

wherein Y and Z stand for hydrogen, a hydroxyalkyl or polyhydroxyalkyl group, at least one of these substituents however being a hydroxyalkyl- or polyhydroxyalkyl group.

9. The process which comprises diazotizing 1-hydroxy-2-amino-4,6-dinitrobenzene and coupling it with a substituted meta diamine of the general formula

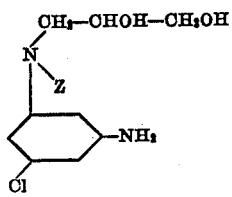

wherein Z stands for hydrogen or the $\beta,\gamma$-dihydroxypropyl group.

10. The process which comprises diazotizing 1-hydroxy-2-amino-4,6-dinitrobenzene and coupling it with 4-chloro-1-amino-3($\beta,\gamma$-dihydroxyprophyl)-aminobenzene.

MAX RAECK.